INVENTOR
Armando R. Ordonez

INVENTOR
Armando R. Ordonez

Sept. 5, 1967   A. R. ORDONEZ   3,339,563
CAR WASHING APPARATUS
Filed Oct. 22, 1965   7 Sheets-Sheet 4

INVENTOR
Armando R. Ordonez

BY

ATTORNEY

INVENTOR
Armando R. Ordonez

Sept. 5, 1967  A. R. ORDONEZ  3,339,563
CAR WASHING APPARATUS
Filed Oct. 22, 1965  7 Sheets-Sheet 7

INVENTOR
Armando R. Ordonez

BY

ATTORNEY 3,339,563
CAR WASHING APPARATUS
Armando R. Ordonez, 2636 Trinity St.,
Irving, Tex. 75060
Filed Oct. 22, 1965, Ser. No. 511,267
22 Claims. (Cl. 134—57)

This application is a continuation-in-part of application Ser. No. 409,812, filed Nov. 9, 1964, and now abandoned.

The present invention relates to apparatus for cleaning motor vehicles and more particularly to automatic car washing apparatus of the type which is suitably coin operated.

In recent years, automatic car washers have been accorded a wide degree of acceptance. In general, there are three types. The first type includes a housing and a continually moving sprocket chain to which the cars are attached in order that they can be towed through the wash apparatus. Water and detergent are dispensed from overhead assemblies onto the passing car as it is towed through the housing while a crew of men wipe down the car prior to the final rinse and drying.

In the second type of car wash, there is also provided a housing. A track is provided within the housing and supported above a level of the automobile to be washed. A pipe is bent in the shape of substantially an inverted U and supported for movement along the track or tracks. When the apparatus is actuated, suitably by a coin operated device, water and detergent are sprayed from the U-shaped pipe as the pipe moves along the track in one direction. The pipe is then returned to its original position, but only spraying water to rinse the detergent from the motor vehicle.

In still a third type of car washing apparatus, which is also suitably coin operated, at least two pipes which are bent in the shape of substantially an inverted U are provided. One of the pipes sprays a mixture of detergent and water and the second pipe only sprays water. After the apparatus has been actuated, the driver of the motor vehicle causes the vehicle to move through the sprays at a slow rate of speed to provide the desired cleaning action.

Best results are normally obtained with the first type of apparatus due to the work done by the crew of men. However, although the first type of apparatus permits a substantial saving in time and money over completely manual car washing operations, the cost of the labor is still quite substantial.

As a consequence, car washes of the type exemplified by the second and third types have been accorded substantially a greater degree of popularity in more recent years. However, due to the shape of the body of most cars, during that portion of the rinse cycle in which water is being sprayed across the top of the car, a portion of the fluid comprising a mixture of the detergent and water will usually tend to flow back over the portion that has been previously rinsed. It is therefore necessary to use quite a large volume of water to insure that all of the detergent is removed from the surface of the car. The car washes wherein the car is driven through the sprays are subject to a further disadvantage in that the success of the operation is dependent to a large degree upon the speed at which the car is driven through the car wash. If the car is driven too fast, an acceptable degree of cleaning will not be achieved. Moreover, the time of operation must be sufficiently extended to allow for the car to be driven through quite slowly, creating a waste of water and chemicals.

In accordance with the present invention, there is provided an automatic car wash system which utilizes two spray arcs with the spray arcs moving upon tracks but in opposite directions at all times. Thus, in accordance with the present invention, at least one track is provided which spans a distance greater than the length of the car. Each of the two spray arcs is positioned at extreme opposite ends of the track at the beginning of a wash cycle.

When the apparatus is actuated, the mixture of water and detergent is pumped through the spray arcs at high pressure, causing the spray of water and detergent to impinge upon the car. The two spray arcs move toward the central portion of the track until they meet at the center. Movement of the spray arcs is timer controlled and a time delay is positioned when the two arcs reach the center point to permit time for the detergent to act upon the films and foreign material on the surface of the vehicle. After the short waiting period, the flow of detergent into the water line is stopped and the rinse cycle begins with the spray arcs again moving toward the extremities of the track. Also, there is preferably provided a plurality of stationary nozzle positions with the nozzles adapted to traverse a vertical arc for the purpose of increasing the force and amount of water and detergent acting upon the front and rear of the automobile.

Several important advantages are obtained utilizing the above apparatus. First, the length of flexible hose connected to the spray arcs can be reduced substantially, effectively increasing the pressure at the spray nozzles and permitting better cleaning action. Secondly, since the two spray nozzles move in opposite directions away from the center portion of the car, there is substantially less tendency for water containing detergent to flow back over the rinsed surface. As a consequence, the amount of water required to obtain good rinsing is reduced substantially, reducing the cost of operation. Third, by utilizing a timer controlled operation, it is practical to provide a desired delay between the application of the detergent and the rinse cycle, assuring better cleaning. The stationary nozzle positions insure improved cleaning of the front and rear surfaces.

The system utilized for supplying water and detergent to the spray arcs also incorporates several novel and advantageous features. The hot water supply tank is positioned above the water heater such that the normal circulation of water can be used for continuously flowing water through the water heater, rendering a separate pump, as is usually provided, unnecessary. The header to which the flexible hoses running to the spray arcs are connected is positioned at a height above the water supply. A three-way valve is provided in the supply line nearer the point at which it connects to the header with the valve normally blocking the flow of water from the storage facilities to the header and venting the header to the atmosphere. Thus, when in normal conditions, the spray arcs and header will be free to drain thoroughly, reducing the possibility of water being held in the header and spray arcs and preventing freezing in cold weather conditions. Also, within the supply system, the detergent mixture is continuously circulated, providing a detergent mixture of uniform and consistent strength and a single line and pump is utilized for supplying both the detergent water cleaning fluid to the spray arcs or the rinse water in accordance with a timed program.

The features of the present invention which are believed novel are set forth with greater particularity in the appended claims. Many objects and advantages of the invention will become apparent to those skilled in the art as the following detailed description of the same unfolds when taken in conjunction with the appended drawings wherein like reference numerals denote like parts and in which:

Figure 1:
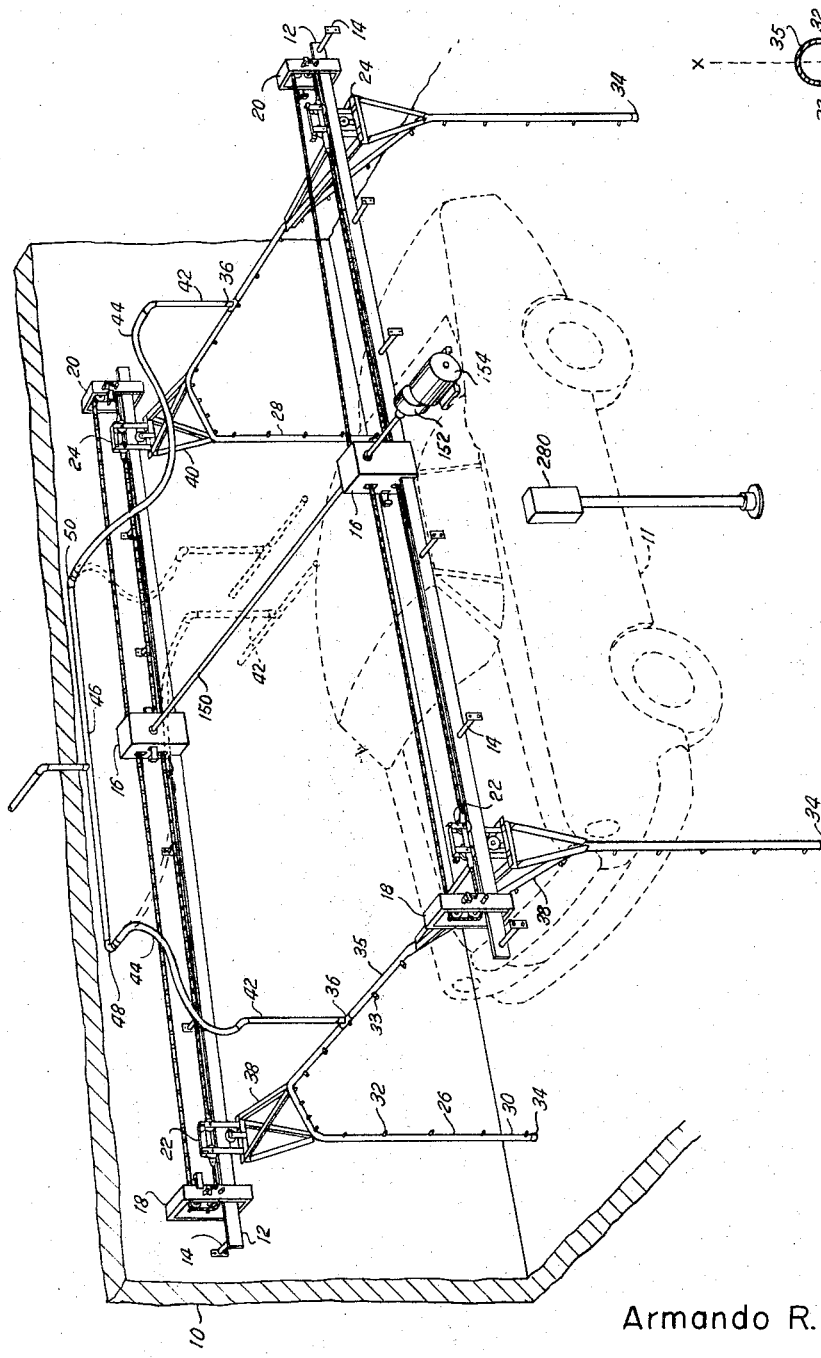
FIGURE 1 is a perspective view of a motor car washing apparatus with a motor car being washed indicated in phantom.

Turning now to FIGURE 1 of the drawings, the reference character 10 designates a wash room which is enclosed on two sides and open at each end whereby the automobile 11 (shown in phantom) to be washed can be driven therethrough. Two parallel spaced apart track rails 12 are supported above the top of the car 11, suitably from the walls of the structure 10 by members 14 as shown.

A drive gear box 16 is positioned at the median point of each of the track rails 12 and idler gear boxes 18 and 20 are positioned toward the extremities of each of the track rails. The idler boxes 18 and 20 are suitably equidistant from the gear drive box 16, with the separation between the idler boxes 18 and 20 being greater than the length of the motor vehicle to be washed. A trolley 22 is mounted on each of the track rails 12 for movement between the drive gear box 16 and the idler gears 17 and in similar fashion, a trolley 24 is mounted on each of the track rails 12 for movement between the drive gear box 16 and the idler gear box 20.

Spray arcs 26 and 28 are also provided. As shown, the spray arcs 26 and 28 each comprise a length of pipe 30 bent in a substantially U-shaped configuration with a plurality of spray nozzles 32 spaced along its length and positioned to direct a spray inwardly toward the automobile to be washed. Each of the spray nozzles 32 are preferably positioned at an angle to the vertical plane defined by the spray arc such that fluids flowing from the nozzles is directed slightly toward the opposing spray arc, facilitating coverage of the front and rear ends of the vehicle. Additional spray nozzles 33 which are positioned along the horizontal portion 35 can also be provided, the nozzles 33 being directed slightly outward. The ends 34 of the pipe 30 are sealed and a T 36 is provided at the central portion of the spray arcs 26 and 28.

Figure 9:
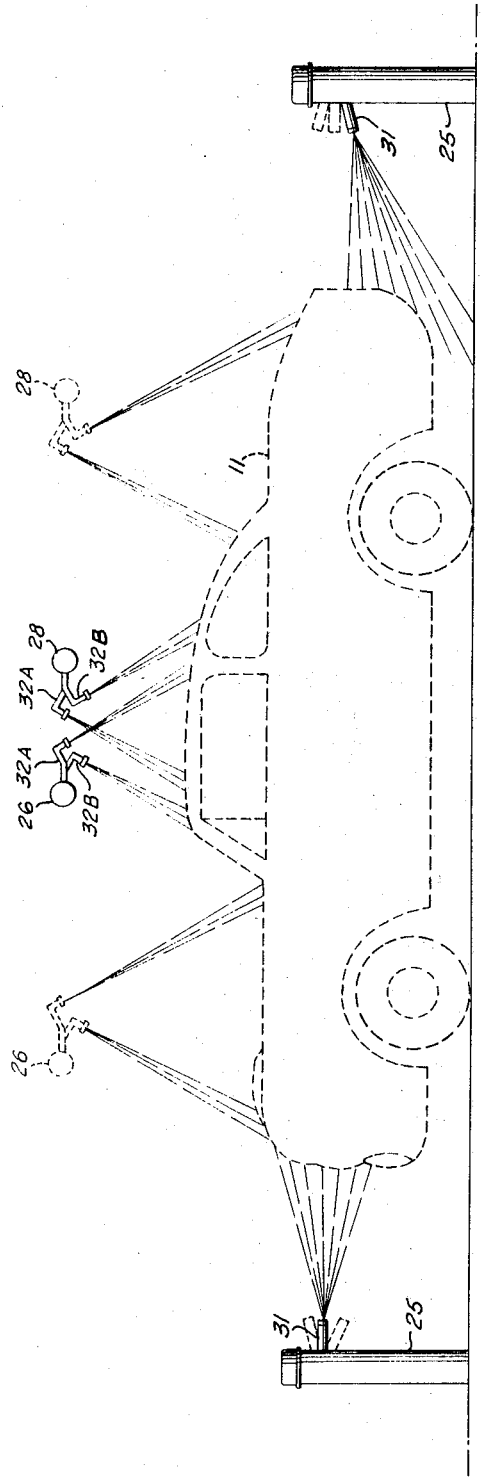
FIGURE 9 is a side elevation view illustrating the manner in which a preferred nozzle arrangement provides improved cleaning and rinsing.
Figure 10:
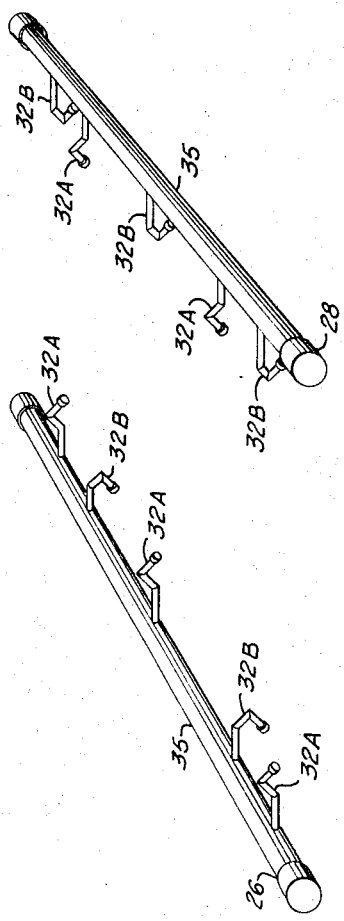
FIGURE 10 is a perspective view showing the relationship between the nozzles on the two moving spray arcs.
Figure 11:
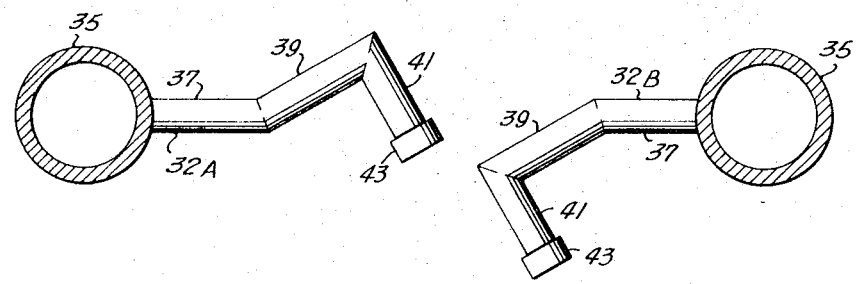
FIGURE 11 is a view further illustrating the relationship between the nozzles on the two moving spray arcs.

The preferred nozzle arrangement is shown in FIGURES 9, 10 and 11 wherein nozzle assemblies 32A and 32B project from the horizontal portion 35 of each of the spray arcs 26 and 28. As best seen in FIGURE 11, the nozzle assembly 32A includes a horizontally disposed length of tubing 37 connected to the horizontally disposed portion 35 for communication therewith, the other end of the length of tubing 37 being connected to a length of tubing 39 that is bent upward at an angle of approximately 30° to a horizontal plane. The other end of the tubing 39 is connected to a third length of tubing 41, the juncture between the lengths of tubing 39 and 41 being approximately a right angle. A nozzle fitting 43 is carried by the tubing 41. Nozzle fitting 43 is suitably of the type that will provide a fan shaped spray in a plane normal to the drawing. Nozzle assembly 32B may also be seen to include tubing members 37, 39 and 41 which carry a nozzle fitting 43, the difference being that in the nozzle assembly 32B, the length of tubing 39 is connected to tubing member 37 such that it angles downward at an angle of approximately 30° to a horizontal plane. The spray arc from the nozzles of the nozzle assemblies 32A and 32B will therefore both impinge upon a horizontal surface positioned beneath the nozzles 43 at an angle of approximately 60°.

As best seen in FIGURE 10, each of the spray arcs 26 and 28 include a plurality of the nozzle assemblies 32A and 32B and, in each instance, a nozzle assembly 32A is positioned in opposing relationship to a nozzle assembly 32B. The preferred nozzle arrangement results in substantially improved cleaning due to the fact that the water and detergent will impinge almost directly upon any surface of a car and, more importantly, much better rinsing is obtained.

Thus, as shown in FIGURE 9, as the spray arcs 28 and 30 move toward the center of the car, the spray emitted by the nozzle assembly 32A will impinge upon the surfaces of the automobile, particularly the front and rear surfaces and the windshield and rear window with much greater angle of incidence than would be true if the nozzle were positioned in a vertical plane. On the other hand, at the end of the detergent dispensing cycle, when rinse water is being applied, the spray arcs 26 and 28 will again move toward their initial position at the end of the car. While the two spray arcs 26 and 28 are in the position near the center of the car, all of the water emitted by the sprays 32A and 32B will be directed to flow water containing the detergent and dirt on the surface of the automobile away from the center of the car, thereby initiating a flow of water in the desired direction. As the spray arcs 26 and 28 thereafter move apart in the course of returning to their position at the end of the car, the stream of water produced by the spray arcs 32B will be effective to continuously push the water containing the detergent and dirt ahead of the spray arcs. Water impinging upon the car from the nozzle assemblies 32A will not be directed in the desired direction, but will provide a secondary rinsing action.

The spray arc 26 is supported from the pair of trolleys 22 by members 38 with the spray arc 26 disposed in a substantially vertical plane transverse to the track rails 12 with the ends 34 of the pipe 30 extending to a point near the floor of the housing 10. In similar fashion, the spray arc 28 is supported by the pair of trolleys 23 by members 40. Each of the spray arcs 26 and 28 also suitably includes a vertically disposed length of pipe 42 which is connected at one end to the T 36 and at its other end through a length of flexible tubing 44 to the supply header 46. It will be noted that the end 48 of the header 46 is disposed substantially at the median point between the drive gear box 16 and the idler gear box 18 whereas the end 50 of the header 46 is disposed substantially at the median point between the drive gear box 16 and idler gear box 20.

Figure 12:
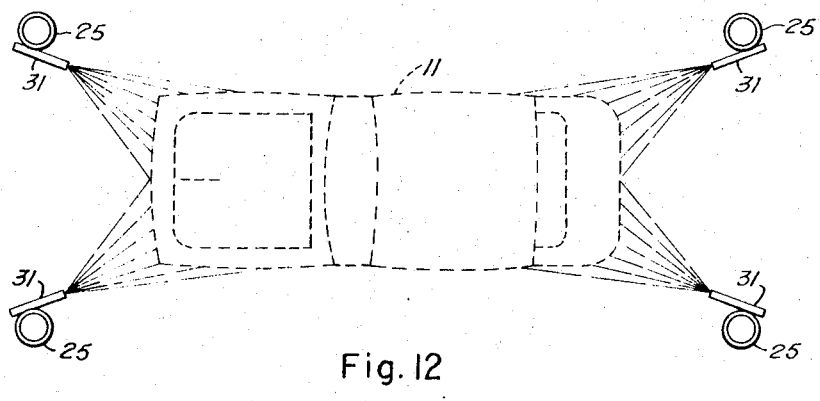
FIGURE 12 is a plan view schematically illustrating the manner in which nozzles at stationary positions cause water and detergent to impinge directly upon the front and rear surfaces of an automobile.
Figure 13:
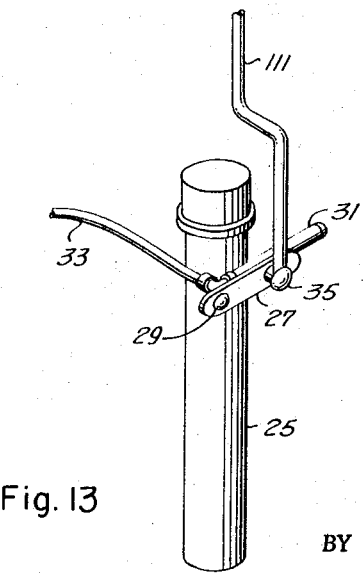
FIGURE 13 is a perspective view illustrating one of the stationary nozzle positions.

There is also provided four posts 25 that are positioned in a rectangular arrangement, the length of the rectangle being greater than the length of the car and the width of the rectangle being greater than the width of the car. The arrangement of the posts is such that when the car is stopped in readiness for cleaning, the car will be substantially in the center of the rectangle defined by the four posts 25, as shown in FIGURES 1 and 12. As best seen with reference to FIGURE 13, a member 27 is pivotally mounted to each of the posts at 29. Member 27 carries a spray nozzle 31 which receives a supply of water or water and detergent through pipe 33 (not shown in FIGURE 1). A member 111 is connected to the other end of the member 27 at 35 for causing the member 27 and the spray nozzle 31 carried thereby to traverse a vertical arc. The spray from nozzle 31 is primarily directed at the vertically disposed front and rear surfaces of the car, as shown in FIGURES 9 and 12, insuring adequate cleaning of these surfaces which may not otherwise receive proper coverage from the nozzles carried by the moving spray arcs. Also, spray is continually directed toward the front and rear surfaces during the wash cycle. This is desirable in that the front and rear of an automobile are often much dirtier than other surfaces and therefore more difficult to clean.

Figure 2:
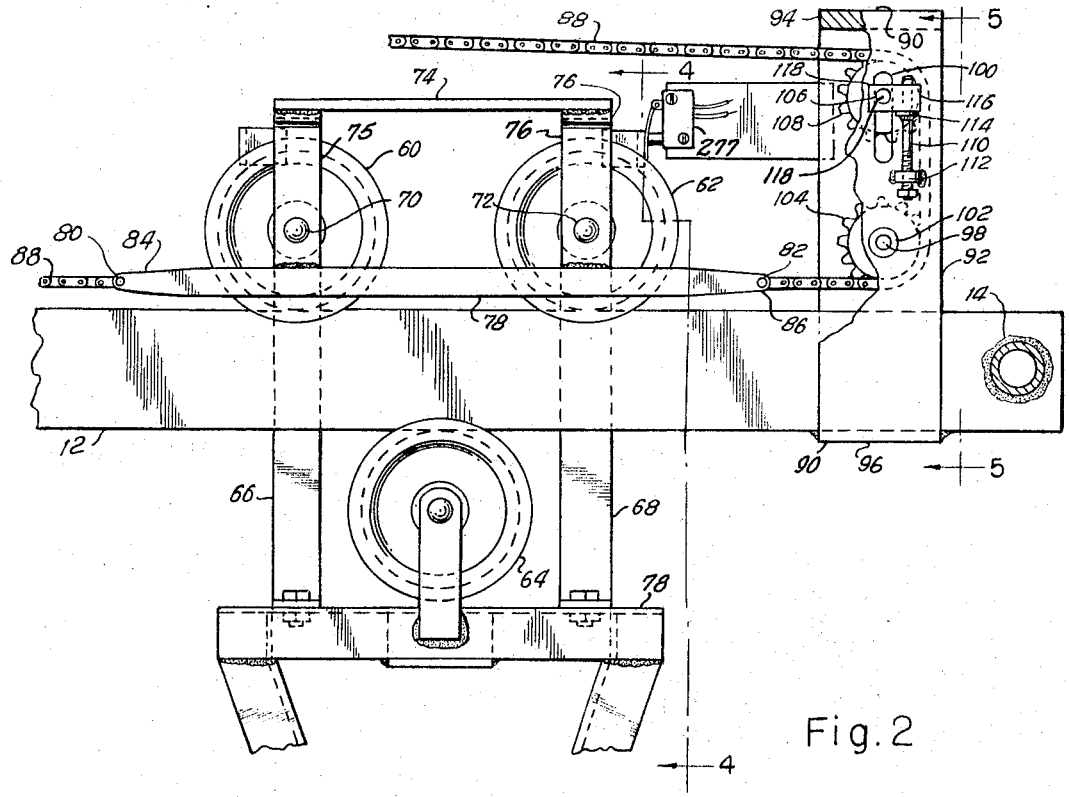
FIGURE 2 is an enlarged side elevation view of a portion of the apparatus shown in FIGURE 1.
Figure 4:
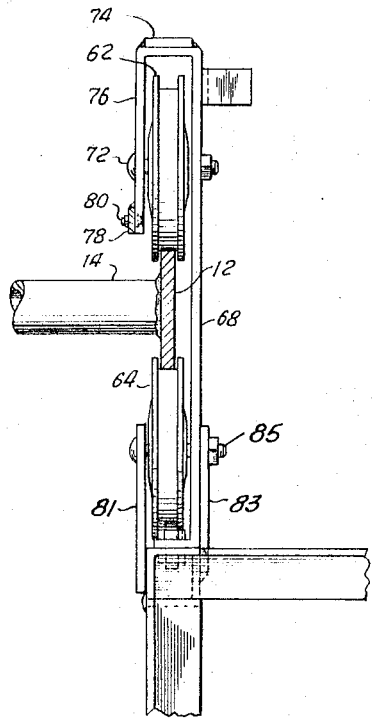
FIGURE 4 is a view taken along line 4—4 of FIGURE 2.
Figure 5:
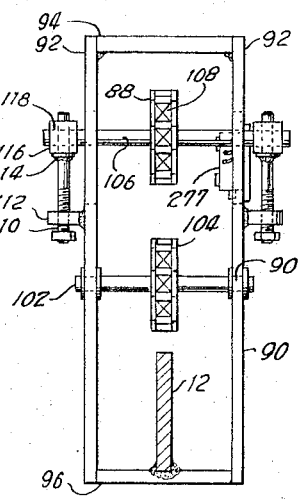
FIGURE 5 is a view taken along line 5—5 of FIGURE 2.

Turning now to FIGURES 2, 4 and 5 of the drawings, the constructional features of the trolleys 22 and 24 and the idler gear boxes 18 and 20 are shown in greater detail. Thus, the trolleys 22 and 24 each suitably comprise three wheels 60, 62 and 64, each of the wheels suitably having a groove formed in its periphery adapted to engage an edge of the rail 12. It will be noted that the wheels 60 and 62 engage the upper edge of the rail whereas the wheel 64 engages the lower edge of the rail, providing vertical and horizontal stability.

Two vertically disposed members 66 and 68 are also provided. The upper ends of the members 66 and 68 are suitably connected to a horizontally disposed member 74. Depending from the member 74 and substantially parallel to members 66 and 68 are vertically disposed members 75 and 76. It will be observed that members 75 and 76 are spaced apart from the members 66 and 68, respectively. The members 75 and 76 are each substantially shorter than the members 66 and 68, suitably extending only slightly below the center of the wheels 60 and 62. The wheel 60 is journalled for rotation on a shaft 70 which extends between the member 66 and the member 75. Similarly, the wheel 62 is journalled for rotation on a shaft 72 which extends between the member 68 and member 76.

A horizontally disposed member 78 is connected to the lower end portions of the members 75 and 76, with the horizontally disposed member 78 being positioned above the upper edge of the rail 12. Pins 80 and 82 suitably pass through the ends 84 and 86 of the member 78 for purposes of attaching the ends of a chain 88 thereto. A horizontally disposed member 79 connected to the lower ends of members 66 and 68 is also provided. Two upstanding supports 81 and 83 are connected at their lower end to the median point of member 79. The wheel 64 is journalled for rotation on shaft 85 extending between supports 81 and 83.

Each of the idler gear boxes can be seen to comprise a rectangular frame 90 having two vertically disposed side pieces 92, a horizontally disposed top piece 94 and a horizontally disposed bottom piece 96. The rail 12 suitably passes through the frame 90, with the lower portion of the rail 12 attached, suitably by welding, to the lower portion 96 of the frame 90. An aperture 98 and a slot 100 are formed in each of the vertically disposed pieces 92, each of the holes 98 being opposed to one another and each of the slots 100 being opposed to one another.

A shaft 102 extends between the two side pieces 92 and through the holes 98. A cog gear 104 is journalled for rotation of the shaft 102 with the lower periphery of the cog gear being in substantially the same plane as the horizontally disposed member 78 of the trolley. A shaft 106 also extends between the side members 92, with the shaft 106 extending through the slots 100. A cog gear 108 is suitably journalled for rotation on the shaft 106. A cranking member, suitably comprising a disk 107 keyed for rotation with shaft 102 and having a pin 109 projecting outwardly therefrom and parallel to shaft 102 is also provided. The end of rod 111 receives pin 109, with pin 109 being free to turn in rod 111. As shaft 102 rotates, the rod 111 will move up and down, causing the nozzles 31 to traverse the desired vertical arc.

Also, as shown, an adjustment means is provided on each of the side pieces 92, the adjustment means comprising a vertically disposed bolt 110 which passes through a threaded insert 112 which is attached, suitably by welding, to a side piece 92. The threaded stud 110 includes a shoulder portion 114. That portion of the stud member lying above the shoulder 114 passes through an opening in a rectangular body 116. The shaft of the member 116 also includes a horizontally disposed hole 118 through which the shaft 106 passes. Thus, when the stud 110 is turned, the shoulder 114 will move up or down in a vertical direction dependent on the direction that the stud is turned. As the shoulder 114 moves vertically, it will also cause the member 116 to be displaced, raising or lowering the cog gear 108 to provide the desired degree of tension on the drive chain 88.

Figure 3:
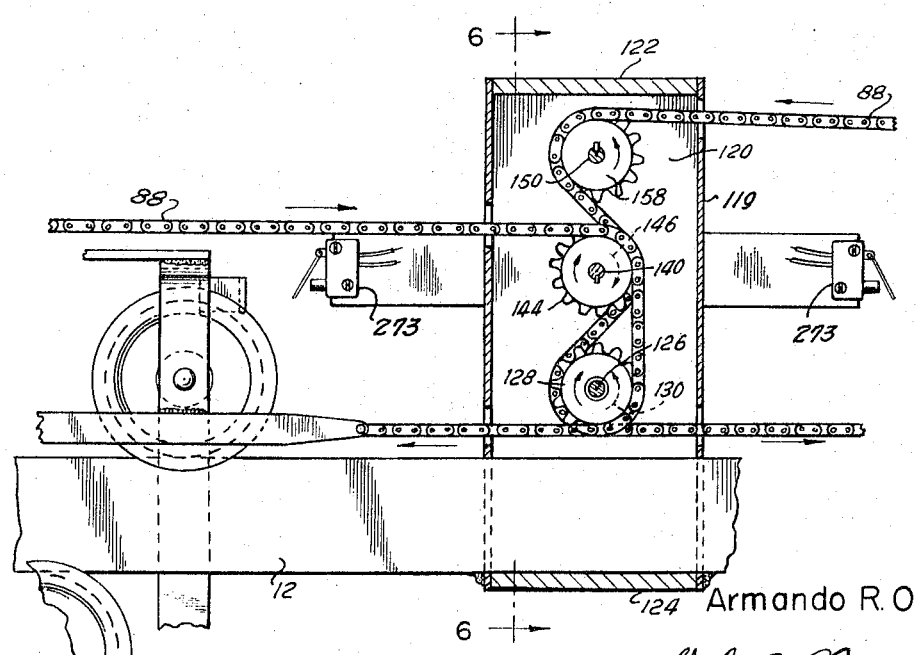
FIGURE 3 is an enlarged side elevation view of a different portion of the apparatus shown in FIGURE 1.
Figure 6:
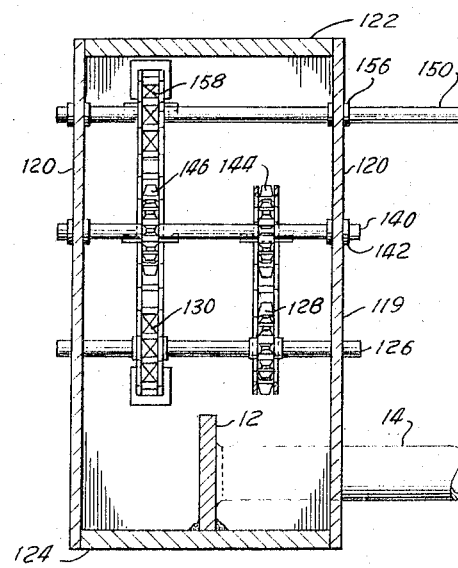
FIGURE 6 is a view taken along line 6—6 of FIGURE 3.

The drive gear boxes 16 are each suitably as shown in FIGURES 3 and 6 of the drawings and can be seen to comprise two vertically disposed side pieces 120, a horizontally disposed top piece 122 and a horizontally disposed bottom piece 124. The track rail 12 extends through the frame 119 with its lower edge attached, suitably by welding, to the lower member 124.

A first shaft 126 extends between the side pieces 120 and is connected thereto. Cog gears 128 and 130 are each journalled for rotation on shaft 126, with the lower periphery of gears 128 and 130 being above the upper edge of track rail 12 and substantially in the same plane as cog gear 104 of the idler gear boxes. Positioned above the shaft 126 is a second shaft 140 which passes through the side members 120 and is journalled for rotation in bearings 142. Cog gears 144 and 146 are each affixed to the shaft 140 for rotation therewith. It can be seen that gears 128 and 130 are aligned vertically with gear 144 and 146, respectively.

The main drive shaft 150, as perhaps best shown in FIGURE 1, extends between the two drive gear boxes 16 and is connected to a reducing gear 152 which is driven by a motor 154. The drive gear 150 is journalled for rotation in bearings 156 provided in the walls 120 of the gear boxes 16. Within each of the drive gear boxes 16, there is provided a cog gear 158 which is connected for rotation with the shaft 150. The gear 158 is aligned vertically with gears 130 and 146.

Thus, as shown in FIGURE 3, when the motor 154 is driven to cause the shaft 150 to rotate in a counter-clockwise direction, the cog gears 144 and 146 will each be driven in a clockwise direction, the cog gear 128 will also turn in a clockwise direction and the cog gear 130 will turn in a counter-clockwise direction. Each of the chains 88 will therefore move in a direction to cause the trolleys 22 and 24 to move away from the drive gear box. When the shaft turns in a clockwise direction, the gears and chains will move in a direction to cause the trolleys to move toward the drive gear box.

Figure 7:
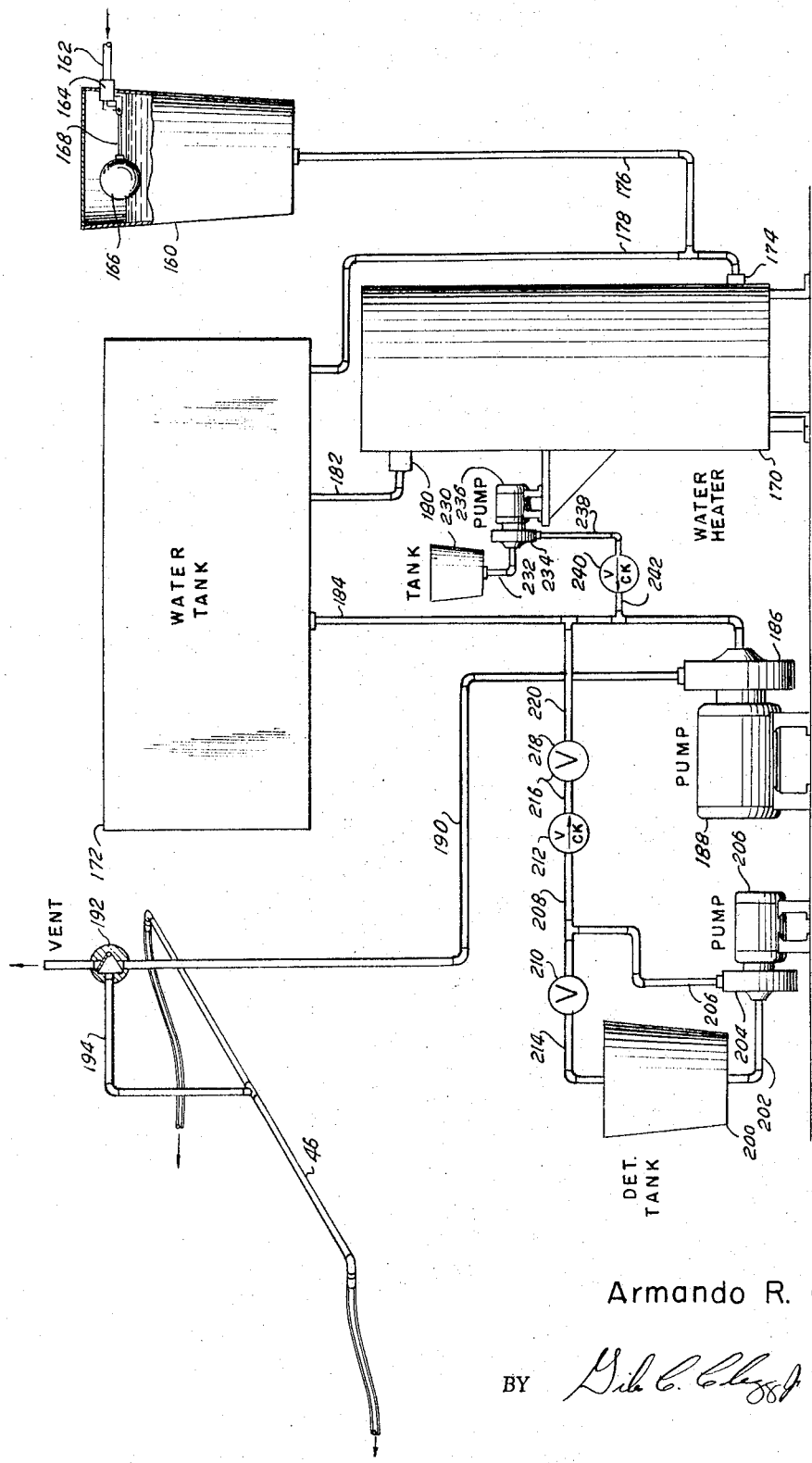
FIGURE 7 is a view schematically illustrating an apparatus for supplying detergent and water to the apparatus shown in FIGURE 1.
Figure 8:
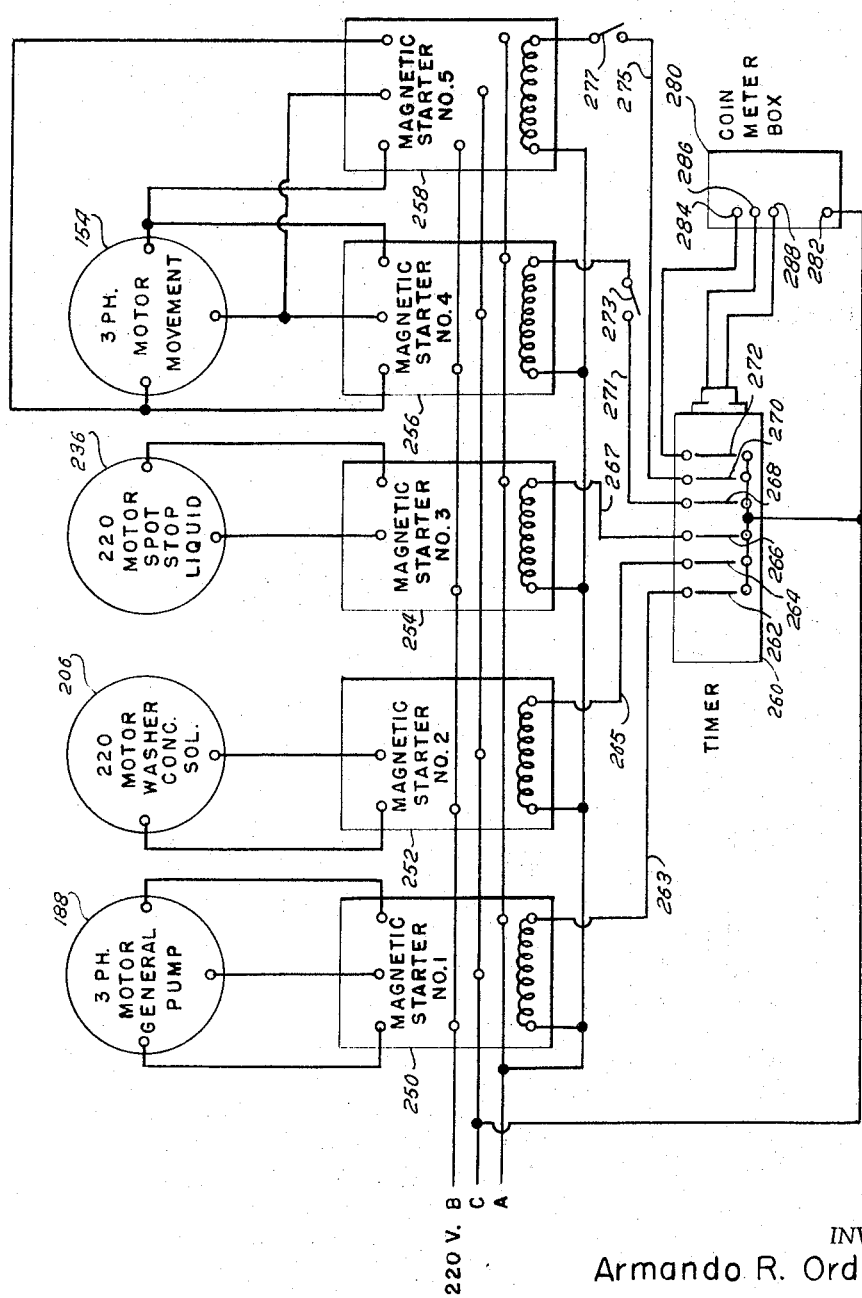
FIGURE 8 is an electrical schematic diagram illustrating the manner in which the apparatus shown in FIGURES 1 and 4 is controlled.

The plumbing associated with the apparatus is shown in FIGURE 7 of the drawings and can be seen to comprise a tank 160. A pipe 162 which connects to the water supply empties into the top portion of the tank at a position above the normal water level. The flow of water from the pipe 162 into the tank 160 is controlled by a valve 164 which is operated by a float 166 and a lever 168. Thus, when the water in the tank 160 falls below a desired level, float 166 will fall, opening the valve 164 and permitting water to flow into the tank until the water achieves the level at which the float will rise to a position closing the valve 164. Such an arrangement is generally required by ordinance to prevent any possibility of the chemicals utilized in the car washing apparatus being returned to the main water lines.

A water heater 170 and a water storage tank 172 are also provided, the water tank 172 suitably being positioned above the water heater 170. The inlet 174 of the water heater 170 is suitably connected by pipe 176 to the tank 160 and by pipe 178 to the tank 172. The outlet 180 of the water heater 170 is connected by pipe 182 to the tank 170. The water heated by the water heater 170 will flow out the outlet 180 and through pipe 182 into tank 172. The cooler water within the tank 172 will flow through line 178 to the inlet 174 of water heater 170. As a consequence, water will continuously be circulating between the water 70 and the tank 172, maintaining the water in the tank 172 at an elevated temperature without the necessity for a pump. Alternatively, pipe 176 can be connected to the water supply and solenoid operated valves provided in lines 176 and 178 which are responsive to the level of water in tank 172. The operation of the valves is such that when tank 172 is full, the valve in line 176 would close and the valve in line 178 would open. If the water level in tank 172 is low, the valve in line 176 would open and the valve in line 178 would close, causing supply water to flow under pressure into water heater 170.

A pipe 184 is also provided which extends from the tank 172 to the input of a main pump 186. The main pump 186 is suitably driven by a motor 188. The output of the pump 186 is connected through pipe 190 to a valve 192, with the valve 192 being connected through pipe 194 to the header 46. Pipe 194 is also connected through pipe 33 to the spray nozzles 31 carried by post 25. Valve 192 is of the type that when the pump 186 is not operating, it is spring loaded in a position such that the pipe 190 will be closed and the pipe 194 will be vented to atmospheric pressure. Pipe 194, header 46, lines 44 and spray arcs 26 and 28 will therefore be free to drain when pump 186 is not operated. It will be noted that the valve 192 is positioned at a level above the water level of tank 172 to prevent any possibility of a siphoning action.

There is also provided a detergent tank 200. An outlet is provided in the bottom of the detergent tank 200 which is connected by line 202 to the pump 204. The pump 204 is suitably driven by a pump motor 206. The output of the pump 204 is connected by line 206 to line 208. One end of line 208 is connected to valve 210, the other end of line 208 being connected to a spring check valve 212. The other side of valve 210 is connected by line 214 to tank 200. The other side of check valve 212 is connected by line 216 to one side of valve 218, the other side of the valve 218 being connected through line 220 to line 184. The check valve 212 is positioned such that fluids can only flow through the valve in a direction toward the line 184, and is suitably of the type that requires a substantial amount of pressure in the line 208 before the valve 212 will open to permit passage of fluids. Also, a check valve 221 is suitably provided in line 184 between tank 112 and line 220 for preventing flow into tank 172.

When the valve 210 is substantially completely open, the pressure present at the output of the pump 204 will not be sufficient to cause the check valve 212 to open and a mixture of detergent and water will be continuously circulated by pump 204 through lines 202, 206, 208, valve 210 and line 212 through detergent tank 200 whenever it is desired to mix detergent. The valve 218 is adjusted to control the amount of detergent which is injected into line 184. Further, in actual operation of the system, valve 210 is not closed completely since pump 204 is preferably one having a greater capacity than that permitted to flow through valve 218. If the valve 218 is, for example, adjusted to provide a passage of fluid of three gallons per minute and the capacity of the pump 204 is eight gallons a minute, valve 210 is adjusted such that at any time pump 204 is operating, only three gallons a minute will be injected into line 184 and the remaining five gallons per minute will be circulated through the detergent tank.

There is also provided a smaller tank 230 which contains a liquid additive to present spotting after the rinse operation. The tank 230 is connected by line 232 to the inlet of pump 234. The pump 234 is driven by a motor 236, the outlet of the pump 234 being connected through line 238, check valve 240 and line 242 to line 184. The check valve 240 is positioned in the line such that fluids can only flow from the pump 234 toward the line 184.

From the above, it will be seen that when only the motor 188 is operated, hot water will be pumped from the tank 172 through the nozzles 32 on the spray arcs 26 and 28. If power is supplied to the motor 236, the chemical additive for preventing spotting will be pumped from the tank 230 into the line 184 and rinse water will flow from the nozzles 32. If only the motor 188 and motor 206 are operated, a mixture of hot water and detergent from the tank 200 will flow through the nozzles. If only the pump 206 is operated and the valve 210 is open, the detergent will be circulated through the tank to provide mixing.

The electrical circuitry associated with the apparatus is shown in schematic form in FIGURE 5 of the drawings. Power is applied to the system from a source of alternating current supply voltage, suitably 220 volts, 60 cycles, having three phases, A, B and C. As indicated, the motor 188 which drives the main pump 186 is of the three phase type and is controlled by a magnetic starter 250. The detergent pump 206 is of the single phase type and is controlled by a magnetic starter 252. The motor 236 which drives pump 234 is also of the single phase type and is controlled by a magnetic starter 254. The motor 154 which controls the movement of the spray arcs 26 and 28 is also of the three phase type and is controlled by two magnetic starters 256 and 258.

A timer 260 is also provided. The timer 260 can be one of several different types, but in accordance with one specific example of the invention, was of a motor driven type that includes six sets of contacts 262, 264, 266, 268, 270 and 272. One side of all of the contacts within the timer are commonly connected to phase C of the power line. One side of each of the magnetic starters 250, 252, 254, 256 and 258 are each connected to phase A of the power line.

There is also suitably provided a coin meter box 280. One terminal 282 of the coin meter box is connected to line C of the power line. A second terminal 284 of the meter box is connected to the other side of contact 272 of the timer and contacts 286 and 288 of the coin meter box are connected to apply power to the timer motor when a coin is inserted into the meter box.

The other side of the contact 262 is connected through line 263 to one side of the magnetic starter 250. In similar fashion, the other side of contacts 264 and 266 are connected through lines 265 and 267, respectively, to the other side of the coils of magnetic starters 252 and 254. The other side of the contact 268 is connected through line 271 and switch 273 to the other side of the coil of the magnetic starter 256. The other side of the contact 270 is connected through line 275 and switch 277 to the other side of the coil of magnetic starter 258. Switches 273 and 277 are protective devices and are normally closed.

The operation of the apparatus is as follows. The driver of the motor vehicle to be washed will enter the washing chamber 10 and position the car at a point substantially equidistant between the spray arcs 26 and 28. Positioning of the car is facilitated by suitably positioning the coin box 280 at a location within the building such that when the driver's window is adjacent to the coin box, the automobile will be centrally located, as shown in FIGURE 1.

When the driver inserts the proper amount of money into the coin box, the timer motor will start. A time interval of approximately thirty seconds is then provided to permit the driver to insure that all windows in the car are closed. At the end of the thirty second interval, at a time $T_1$, contacts 262 and 264 of the timer will close, applying power to the windings of magnetic starters 250 and 252. When power is applied to the starters 250 and 252, the motors 188 and 206 will start, causing pumps 188 and 204 to be driven.

When the pump 204 is operated, it will cause detergent to be injected into the line 184 at a rate dependent upon the setting of the valve 218. Also, as described previously, a portion of the detergent solution pumped by the pump 204 will be recirculated back to the detergent tank through valve 210. When pump 186 is operated, with the pump 204 also operating, pump 186 will cause a mixture of detergent and water from tank 172 to flow through the header 46 and out the spray nozzles 32 and 33 on the spray arcs 26 and 28.

Approximately five seconds later, at time $T_2$, contact 268 will close, applying power to the magnetic starter 256. When the magnetic starter 256 is energized, it will apply power and cause the three phase motor 154 to start, with the motor 154 turning in a direction to cause the shaft 150 to rotate in a clockwise direction and drive the trolleys 22 and 24 toward the drive gear boxes 16. As the trolleys 22 and 24 move toward the drive gear boxes, the spray arcs 26 and 28 will also move in that direction, causing a mixture of water and detergent to impinge upon the surface of the car with a substantial amount of force. As indicated previously, the spray nozzles 32 are directed slightly to the vehicle being washed, insuring that the wash fluid will cover all surfaces.

Power will be continuously applied to the starter 256 until time $T_3$. The time $T_3$ occurs at an interval of time following time $T_2$ sufficient to permit the spray arcs 26 to travel from their initial position near the end of the track rails 12 to the center position shown in phantom in FIGURE 1 of the drawings. At time $T_3$, the contacts 264 and 268 of timer 260 will open. The motor 154 will stop, preventing further movement of the trolleys along the rails 12. The motor 206 will also stop and additional detergent will not be pumped.

A short waiting period is then provided to give the detergent an opportunity to act upon the films and foreign matter which may be on the surface of the car being washed. Therefore, approximately ten seconds later, at time $T_4$, contact 266 will close. Upon the closing of contact 266, power will be applied to the starter 254, causing motor 236 which drives pump 234 to start.

When pump 234 is driven, the spot preventing chemical will be pumped into the line 184 and the liquid discharged from spray nozzles 32 and 33 will be a mixture of water and the spot preventative. Approximately five seconds after time $T_4$, at time $T_5$, contact 270 will close, applying power to magnetic starter 258. When magnetic starter 258 is energized, it will cause motor 254 to run but with a direction of rotation opposite from that when starter 256 is energized. When motor 154 starts, shaft 150 will therefore rotate in a counter-clockwise direction as shown in FIGURE 3, causing the trolleys to move away from the center position toward the end position shown in FIGURE 1.

During the time interval between $T_4$ and $T_6$, a mixture of water and the spot preventing chemical will be sprayed upon the surface of the car, rinsing the detergent and water solution from the surface. Much better rinsing action is produced by the action of two spray arcs simultaneously moving away from the central portion of the car toward the front and back, respectively, since there is much less possibility of water containing detergent flowing onto a previously rinsed portion. Also, the spray nozzles 33 are, as mentioned previously, directed outward such that the fluid sprayed from nozzles 33 will cause the rinse water to flow away from the center of the car, further reducing the possibility that detergent will not be removed. As a consequence, the amount of rinse water required is reduced substantially, reducing the cost of operating the apparatus.

At time $T_6$, the trolleys 22 and 24 will have returned to their original position and contacts 262, 266 and 270 of the timer 260 will open and contact 272 of the timer will close. As contact 270 of the motor opens, power will be removed from motor 154, preventing further movement of trolleys 22 and 24 along rails 12. Also, when contacts 262 and 266 open, power will be removed from motors 188 and 236 and additional water and spot preventative will not be pumped. When motor 188 stops, the pressure at the output of pump 186 will no longer be present and valve 192 will return to its original position in which line 194 is vented to atmosphere and line 190 is closed. Line 194, header 46, flexible lines 44 and spray arcs 26 and 28 will thereupon drain until they are free of fluids.

Also, at time $T_6$, contact 272 of timer 260 will be closed. When contact 272 closes, power is applied from line C to terminal 284 of coin meter box 280, returning the coin meter box to its original position.

Switches 273 and 277 are protective devices which prevent the trolleys moving past desired limits in either direction, in the event the timing should be off slightly. Thus, a switch 273 is positioned adjacent either side of the drive gear boxes 16. Each switch 273 is suitably of the micro switch type and adapted to be open when a portion of the trolley bears against the contact thereof. As mentioned previously, switches 273 are normally closed and will never be opened unless and until trolleys 22 and 24 move undesirably close to the gear drive boxes 16. Switches 273 will not, however, affect the energization of the motor 154 when it is desired to move the trolleys from the center position to the end positions. In similar fashion, protective switches 277 are positioned adjacent each of the idler gear boxes 18 and 20 to remove power from the motor when the trolleys 22 and 24 reach the desired end position and prevent the trolleys being driven into the idler gear boxes. It will be appreciated, however, that the protective switches 273 and 277 are not intended to be the primary control for the motor 154, as the primary control for the motor 154 is the timer 260.

Although the invention has only been described with reference to a particular preferred embodiment thereof, many changes and modifications will become obvious to those skilled in the art in view of the foregoing description. The invention is therefore not to be limited to the details of the foregoing examples but only as necessitated by the scope of the appended claims.

What I claim is:
1. A car wash system comprising:
    (a) at least one track rail supported in a horizontally disposed position, said track rail being of a length greater than the length of the motor vehicle to be washed;
    (b) first and second spray arcs;
    (c) each of said spray arcs being of a substantially inverted U-shaped configuration and including a cross pipe and two downwardly extending legs adapted to receive a vehicle therebetween;
    (d) first and second trolley means for supporting a respective one of said spray arcs for movement along said at least one track rail;
    (e) said first and second trolley means each normally being positioned toward opposite ends of the track rail whereby the vehicle can be positioned between said first and second spray arcs; and
    (f) means effective when actuated for driving said first and second trolley means in opposite directions along said at least one track rail toward the median point of said track rail and thereafter reversing the direction of movement of said first and second trolley means to return said trolley means to the normal position.

2. A car wash system as defined in claim 1 wherein said last named means comprises:
    (a) first and second idler gear means positioned at opposite ends of said at least one track rail;
    (b) drive gear means positioned at a median point between said first and second idler gear means;

(c) first flexible belt means engaging said drive gear means and said first idler gear means and connected at each end to said first trolley means;
(d) second flexible belt means engaging said drive gear means and said second idler gear means and connected at each end to said second trolley means;
(e) a shaft connected to said drive gear means; and
(f) means including a motor for rotating said shaft in one direction to cause said first and second flexible belt means to move in respective different directions whereby each of said trolley means moves from a position adjacent a respective one of said idler gear means to a position adjacent said drive gear means and thereafter rotating said shaft in an opposite direction to return each of said trolley means to a position adjacent a respective one of said idler gear means.

3. A car wash system as defined in claim 2 further including a timer effective to apply power to said motor to cause said motor to rotate in one direction for a first time interval sufficient for each said trolley means to move from a position adjacent the respective one of said idler gear means to a position adjacent the drive gear means and after a second time interval to apply power to said motor to cause said motor to rotate in an opposite direction for a third time interval sufficient for each of said trolley means to move from the position adjacent said drive gear means to a position adjacent a respective one of said idler gear means.

4. A car wash system as defined in claim 3 further including first switch means positioned adjacent said drive gear means for removing power from said motor when said motor is driven in said one direction responsive to said trolley means reaching a position adjacent said drive gear means and second switch means positioned adjacent said idler gear means for removing power from said motor when said motor is driven in said opposite direction responsive to said trolley means reaching a point adjacent said respective idler gear means.

5. A car wash system as defined in claim 3 further including a means for supplying a mixture of water and detergent to said spray arcs during said first time interval and means for supplying rinse water to said spray arcs during said third time interval.

6. A car wash system as defined in claim 3 further including:
(a) a supply of heated water;
(b) means including a first pump for supplying heated water to said spray arcs during said first and third time intervals;
(c) a supply of liquid detergent; and
(d) means including a second pump for supplying detergent to said spray arcs during said first time interval.

7. A car wash system as defined in claim 3 further including:
(a) a header having one end positioned at a point intermediate the drive gear means and said first idler gear means and a second end positioned at a point intermediate the drive gear means and said second idler gear means;
(b) flexible tubing means connecting said one end of said header to said first spray arc;
(c) second flexible tubing means connecting the other end of said header to said second spray arc;
(d) a supply of heated water;
(e) means including a first pump having its outlet connected through a three-way valve to said header for supplying heated water to said spray arcs during said first and third time intervals;
(f) said valve being positioned in a vertical plane above said supply of heated water and effective responsive to said first pump being operated to connect said pump to said header and effective when said first pump is not operating to connect said header to atmospheric pressure;
(g) a supply of liquid detergent; and
(h) means including a second pump having its outlet connected to the outlet of said first pump for supplying detergent to said spray arcs during said first time interval.

8. A car wash system as defined in claim 7 wherein said last named means comprises a tank having an inlet and an outlet, said tank containing said supply of liquid detergent, means connecting the outlet of said tank to the inlet of said second pump, means including a first gate valve connecting the outlet of said pump to the inlet of said tank, and means including a check valve and a second gate valve connecting the outlet of said second pump to the outlet of said first pump.

9. A car wash system as defined in claim 8 wherein the volume of fluid pumped by said second pump is greater than the volume of fluid flowing through said second gate valve.

10. A car wash system as defined in claim 7 further including a supply of spot preventing chemical and means including a third pump having its outlet connected to the outlet of said first pump for supplying spot preventing chemical to said spray arcs during said third time interval.

11. A car wash system as defined in claim 3 further including a currency operated control, said currency operated control being effective responsive to the deposit of the proper amount of currency to actuate said timer, said timer further being effective at the end of a cycle to apply a signal to said currency operated control to reset said currency operated control.

12. A car wash system as defined in claim 2 wherein said flexible belt is a chain having open links defined therein, said first and second idler gear means each comprising a first cog gear and a second cog gear, each cog gear having teeth adapted to engage the open links of said chain, means supporting said first cog gear for rotation with its lower periphery in substantially the same horizontal plane as the point of attachment of said belt means to said trolley means, means for supporting said second cog gear above said first cog gear, and means for adjusting the separation between said first cog gear and said second cog gear.

13. A car wash system as defined in claim 12 wherein said drive gear means comprises third, fourth, fifth, sixth and seventh cog gears each having teeth adapted to engage the loops in said chain, means mounting said third and fourth cog gears for rotation in a second shaft with the lower periphery of said third and fourth cog gears lying in substantially the same horizontal plane as the lower periphery of said first cog gear, means mounting said fifth and sixth cog gears for rotation with a third shaft above said third and fourth gears, and means connecting said seventh cog gear for rotation with the shaft connected to the motor, said third, fifth and seventh gears engaging one of said chains whereby rotation of said seventh gear in one direction is effective to cause rotation of said fifth gear in an opposite direction and rotation of said third gear in the one direction, the other chain engaging said fourth and sixth gears whereby said fourth and sixth gears rotate in a common direction opposite to the rotation of said seventh gear.

14. A car wash system as defined in claim 12 further including four posts positioned in a rectangular configuration surrounding a motor vehicle to be washed, each of said posts supporting one of four spray nozzles for pivotal movement in a substantially vertical plane and means including a cranking member coupling each of said four nozzles to one of said idler gear means whereby rotation of the idler gear means connected thereto causes said nozzles to traverse a vertical arc.

15. A car wash system comprising:
(a) a pair of parallel spaced apart track rails supported in a substantially horizontal plane, each of the track rails being of greater length than a motor vehicle to be washed;
(b) first and second spray arcs;
(c) each of said spray arcs being of substantially inverted U-shaped configuration and including a cross pipe and two downwardly extending legs adapted to receive a motor vehicle therebetween;
(d) a first pair of trolleys engaging said pair of track rails and supporting said first spray arc in a vertically disposed position transverse to said pair of track rails;
(e) a second pair of trolleys engaging said pair of track rails and supporting said second spray arc in a vertically disposed position transverse to said pair of track rails; and
(f) means for simultaneously driving said first and second pairs of trolleys in opposite directions from first positions in which the distance between the spray arcs supported therefrom is greater than the length of a vehicle to be washed to second positions wherein the fluids sprayed from said spray arcs cross and thereafter returning each said pair of trolleys to the first position.

16. A car wash system comprising:
(a) a pair of parallel spaced apart track rails supported in a substantially horizontal plane, each of the track rails being of greater length than a motor vehicle to be washed;
(b) first and second spray arcs;
(c) each of said spray arcs being of substantially inverted U-shaped configuration and including a cross pipe and two downwardly extending legs adapted to receive a motor vehicle therebetween;
(d) means for supporting each of said spray arcs for movement along said track rails with said spray arcs disposed in substantially parallel, spaced apart vertical planes; and
(e) means for simultaneously driving said spray arcs in opposite directions from a first position wherein the distance between the spray arcs is greater than the length of a motor vehicle to a second position wherein fluids sprayed from said spray arcs cross and thereafter returning each said spray arc to the first position.

17. A car wash system comprising:
(a) at least one track rail supported in a horizontally disposed position, said track rail being of a length greater than the length of the motor vehicle to be washed;
(b) first and second spray arcs;
(c) each of said spray arcs being of a substantially inverted U-shaped configuration and including a cross pipe and two downwardly extending legs adapted to receive a vehicle therebetween;
(d) means for supporting each of said spray arcs for movement along said at least one track rail;
(e) said first and second spray arcs each normally being positioned toward opposite ends of the track rail whereby the vehicle can be positioned between said first and second spray arcs; and
(f) means effective when actuated for driving said first and second spray arcs in opposite directions along said at least one track rail toward the median point of said track rail and thereafter reversing the direction of movement of said first and second spray arcs to return said spray arcs to the normal position.

18. A car wash system as defined in claim 17 wherein each spray arc further includes a plurality of spray nozzles connected at one end to each spray arc and spaced along the length of said cross pipe and said two downwardly extending legs with the other end of said nozzles directed at an acute angle to the plane of the spray arc toward the other spray nozzles.

19. A car wash system as defined in claim 18 wherein each spray arc further includes at least one spray nozzle connected at one end to said cross pipe and directed downward and away from the other spray nozzles at an acute angle to the plane of the spray arc.

20. A car wash system as defined in claim 17 further including four spray nozzles positioned in a rectangular configuration surrounding the motor vehicle to be washed, with each of said four spray nozzles directed principally at a front or rear corner of the motor vehicle, and means effective responsive to operation of the last named means for continuously causing said nozzles to traverse a vertical arc.

21. A car wash system as defined in claim 17 further including a tank for supplying water to said spray arcs, a water heater positioned below said tank and first and second lines connecting the inlet and outlet of said heater to said tank whereby water will circulate through said water heater and said tank when said first and second lines are open responsive to heating water in said water heater.

22. A car wash system as defined in claim 17 wherein each spray arc includes a horizontally disposed portion adapted to pass over the top of the vehicle and further includes a plurality of spray nozzle assemblies projecting from said horizontally disposed portion toward the other spray arc, one group of said spray nozzle assemblies being shaped whereby the nozzle is directed downward and toward the other spray arc at an angle of approximately 60° to a horizontal plane and a second group being shaped whereby the nozzle is directed downward and away from the other spray arc at an angle of approximately 60° to a horizontal plane, said spray nozzle assemblies being spaced apart with nozzle assemblies from said first group interposed between nozzle assemblies from said second group.

References Cited

UNITED STATES PATENTS

| 2,676,600 | 4/1954 | Vani et al. | 134—123 |
| 2,756,759 | 7/1956 | Swain | 134—123 X |
| 3,038,481 | 6/1962 | Brechtel | 134—57 |

FOREIGN PATENTS

| 1,390,524 | 1/1965 | France. |
| 551,797 | 11/1956 | Italy. |

CHARLES A. WILLMUTH, *Primary Examiner.*

R. L. BLEUTGE, *Assistant Examiner.*